UNITED STATES PATENT OFFICE.

ALEXANDER MUIRHEAD, OF NORWOOD, COUNTY OF SURREY, ENGLAND.

MANUFACTURE OF COMPOUNDS TO BE USED FOR INSULATING, &c.

SPECIFICATION forming part of Letters Patent No. 310,957, dated January 20, 1885.

Application filed December 2, 1884. (No specimens.) Patented in England December 22, 1883, No 5,835.

*To all whom it may concern:*

Be it known that I, ALEXANDER MUIRHEAD, a subject of the Queen of Great Britain, residing at Norwood, in the county of Surrey, in the Kingdom of England, have invented a new and useful Improvement in Manufacturing of Compounds to be Used for Insulating, Protecting, or Analogous Purposes, of which the following is a specification.

The use of gutta-percha for insulating and analogous purposes is well known; but there are certain difficulties connected with the use of the commoner qualities which it has hitherto been found impossible to overcome. Now, the object of the present invention is to produce, in a simple and economical manner, gutta-percha compounds suitable for insulating or protecting electrical conductors and for analogous purposes, by the use of which the difficulties hitherto experienced will be avoided.

In carrying out my invention with respect to the production of a compound to be used chiefly in the preparation of tape or canvas for the outside covering of submarine cables, I take the raw gum and dissolve out the gutta-percha by means of melted paraffine-wax or other hydrocarbon, at a temperature not exceeding the boiling-point of the hydrocarbons employed. The higher the temperature at which the paraffine is maintained the greater is its solvent power, and I therefore maintain it at as high a temperature as possible, not exceeding the limit before mentioned, in order to obtain a solution containing the maximum amount of gutta-percha. The mixture of paraffine and gutta-percha thus produced may then be treated with hot water or steam in any well known and convenient manner, to remove the impurities held in suspension; or, preferably, it may be treated with bisulphide of carbon according to the method adopted in the purification of refuse grease, wax, and similar materials. The purified mixture is then used in the preparation of the tape or canvas for the outside covering of submarine cables. When the gutta-percha is of the lowest quality, I find it desirable to add a small proportion of sulphur to the paraffine-wax—say from about ten to fifteen per cent.

In order to obtain a tough and more resisting surface, I add to the solution of gutta-percha in paraffine-wax some finely-powdered silicated compound—such as blown-out furnace-slag, or what is known as "silicate-cotton" or "slag-wool."

In carrying out my invention as applied to the coating of electrical conductors, I produce a partially-vulcanized compound from gutta-percha and sulphurized oil, which will be sufficiently plastic to put on the wires by passing them through dies, as in the ordinary mode of manufacturing gutta-percha-covered wires.

In preparing this compound I take paraffine-oil or other hydrocarbon mixed with bisulphide of carbon, and add thereto chloride of sulphur. I then immediately mix the whole in any suitable apparatus with any vegetable oil containing a large percentage of what are known as "glycerides" in organic chemistry, until an effervescent action commences. When this action has subsided an elastic spongy mass remains. The proportion of these materials which I find to yield a good product is one hundred parts, by weight, of vegetable oil—say castor-oil, which is composed largely of glycerides—twenty-five parts of bisulphide of carbon, sixteen parts of paraffine-oil, and sixteen to twenty parts of liquid chloride of sulphur. The compound thus produced is washed in paraffine-oil, the excess of oil is pressed out in any convenient manner, and the compound is thoroughly incorporated by hot mixing-rollers with the gutta-percha obtained as above described, or in the ordinary manner, in any suitable proportions. In practice, however, I find that the proportion of three parts, by weight, of gutta-percha to two parts, by weight, of oil compound gives good results. The mixture thus formed is subject to a temperature of from 280° to 300° Fahrenheit for from two to three hours under pressure, when an elastic compound like india-rubber will be produced.

This compound, when ground up in varying proportions with the inferior qualities of gutta-percha, which from their brittleness are now useless for the purpose, can be passed through dies with the wires to be coated in the usual way; or I may mix the sulphurized oil compound at once with the inferior quality gutta-percha on mixing-rollers, and pass the mixture through the covering-machine at a temperature high enough to effect the partial vulcanization of the gutta-percha.

To produce a cheap material for common purposes—such as coating wires for electric lighting—I may add to the above compound a proportion, according to fancy, of purified bitumen. If a harder compound is required, I dissolve in the oil, before treatment with the chloride of sulphur, a quantity of kauri or similar gum in the proportion of thirty parts, by weight, of kauri gum to one hundred parts of oil.

It is advisable, when a purer and more lasting material is desired, to free the linseed-oil, castor-oil, or whatever oil is used in the above process, from all impurities before submitting the same to the action of chloride of sulphur, the only ingredients of the oils essential to the formation of the elastic compound being the glycerides. Sometimes I employ stearine—a solid glyceride which can be obtained in a pure state commercially—in the manufacture of the above elastic compound. A quantity of stearine dissolved in bisulphide of carbon or other solvent is taken and subjected to the action of either fumes of chloride of sulphur or a solution of chloride of sulphur in either paraffine-oil, or in a mixture of paraffine-oil and bisulphide of carbon, with the assistance of agitation, when an elastic compound results similar to that produced from the liquid glycerides contained in linseed, castor, and other oils.

I do not wish to limit this part of the invention to the use of stearine. Any of the pure glycerides extracted from the various oils—such as linseed and castor oils, animal fats, &c.—will do to form the elastic compound required for admixture with gutta-percha; but I prefer to use that obtained from the solid glyceride stearine on account of its higher insulating property.

I am aware that it is not new to mix with gutta-percha various oxidized or sulphurized oils which originally contained glycerides along with other compounds in the manufacture of an elastic compound for electrical purposes.

The compounds formed by using pure glycerides, whether solid or liquid, at the ordinary temperature alone, in the manner above described, I find are superior in insulation resistance to those formed by the similar treatment of oils and fats containing glycerides together with other bodies.

I claim as my invention—

1. The compound to be used for insulating or protecting electrical conductors, which consists of a purified mixture of paraffine-wax or other hydrocarbons and gutta-percha, substantially as described.

2. The compound to be used for insulating or protecting electrical conductors, which consists of a purified mixture of paraffine-wax or other hydrocarbons containing a small proportion of sulphur and gutta-percha, substantially as described.

3. The compound to be used for insulating or protecting electrical conductors, which consists of a mixture of purified gutta-percha, prepared by dissolving the same out of raw gum by means of paraffine or other hydrocarbons, with sulphurized oil prepared by subjecting vegetable oils, stearine, or other glycerides to the action of chloride of sulphur, substantially as described.

4. The compound to be used for insulating or protecting electrical conductors, which consists of a mixture of gutta-percha with sulphurized oil prepared by subjecting vegetable oils, stearine, or other glycerides to the action of chloride of sulphur, substantially as described.

5. The production of a partly-vulcanized plastic compound for coating electrical conductors, which consists in dissolving out the raw gutta-percha in melted paraffine-wax or other hydrocarbon at a high temperature, then purifying the material so obtained, then mixing the same with sulphurized oil prepared by subjecting vegetable oils or stearine to the action of chloride of sulphur, and subjecting the mixture under pressure to a high pressure for two to three hours, substantially as set forth.

6. The production of a partly-vulcanized plastic compound for coating electrical conductors, which consists in dissolving out the raw gutta-percha in melted paraffine-wax or other hydrocarbon at a high temperature, then purifying the material so obtained, then mixing three parts thereof, by weight, with two parts of sulphurized oil prepared by subjecting vegetable oils or stearine to the action of chloride of sulphur, and then subjecting the mixture to a temperature of from 280° to 300° Fahrenheit for from two to three hours under pressure, substantially as set forth.

7. In the manufacture of compounds to be used for insulating, protecting, or analogous purposes, dissolving out the gutta-percha from the raw material by means of melted paraffine-wax or other hydrocarbon at a high temperature, substantially as described.

8. In the manufacture of compounds to be used for insulating, protecting, or analogous purpose, the hereinbefore-described methods of purifying the solution of gutta-percha in paraffine-wax employed therein by treatment of the same with bisulphide of carbon, as set forth.

9. The use of stearine and other pure glycerides in the manufacture of elastic substitution products formed by the action of chloride of sulphur upon such bodies, as described.

10. The compound to be used for insulating or protecting electrical conductors, which consists of a mixture of purified gutta-percha prepared by dissolving the same out of raw gum by means of paraffine or other hydrocarbons with sulphurized oil containing gum-kauri, prepared by subjecting vegetable oils, stearine, or other glycerides containing the same to the action of chloride of sulphur, substantially as described.

11. In the manufacture of compounds to be used for insulating, protecting, or analogous purposes, the hereinbefore-described method of hardening said compound, consisting in adding gum-kauri to the liquid containing the soluble glycerides before treatment with chloride of sulphur, substantially as described.

12. The compound to be used for insulating or protecting electrical conductors, which consists of a mixture of gutta-percha and bitumen with sulphurized oil prepared by subjecting vegetable oils, stearine, or other glycerides to the action of chloride of sulphur, as set forth.

13. In the manufacture of compounds to be used for insulating, protecting, or analogous purposes, the hereinbefore-described method of hardening the mixture of gutta-percha and sulphurized oil by adding purified bitumen thereto, substantially as set forth.

In testimony whereof I have hereunto subscribed my name this 25th day of November, 1884.

ALEXANDER MUIRHEAD.

Witnesses:
WILLIAM TWINING,
*No. 3 Prince Street, Halifax, Notary Public.*
JOHN WATSON FRASER,
*No. 3 Prince Street, Halifax, Clerk.*